Patented Dec. 22, 1936

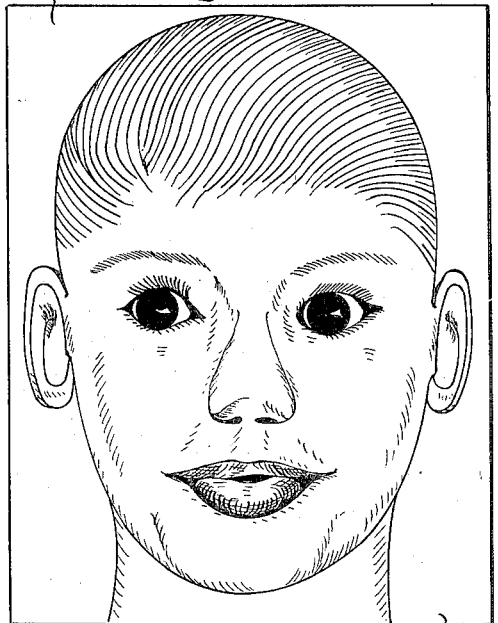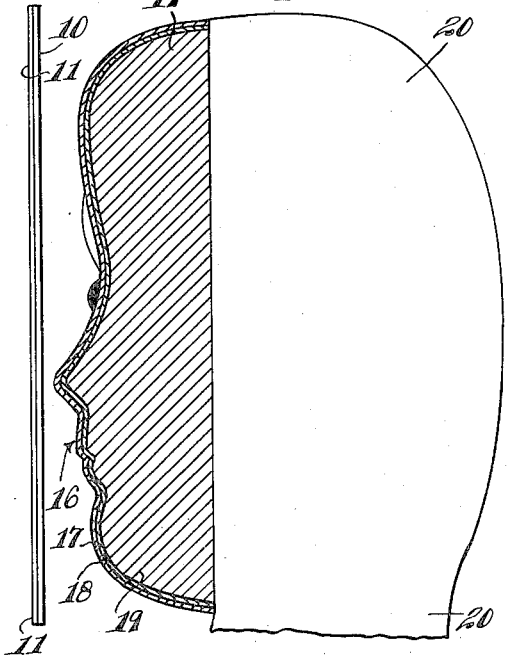
Dec. 22, 1936.   P. KIMSEL   2,065,316
PROCESS OF MAKING REPRODUCTIONS
Filed March 6, 1935
Inventor:
Paul Kimsel,
By Joshua R. H. Potts
his Attorney.
Witnesses:

2,065,316

UNITED STATES PATENT OFFICE 2,065,316

PROCESS OF MAKING REPRODUCTIONS

Paul Kimsel, Chicago, Ill., assignor of one-half to Charles Winter, Chicago, Ill.

Application March 6, 1935, Serial No. 9,572

6 Claims. (Cl. 41—24)

This invention relates to photographs and such and relates more particularly to processes for making, for example, a two-dimensional photograph, three-dimensional, and the product obtained by said process.

An object of the invention among others has been to adapt a photograph, for example, of a child into three-dimensional form so that the photograph in such changed form may be used for a doll head or for a plaque, for example.

Another object has been the provision of a face for a doll or a plaque having a likeness to a particular child, for example, with means for protecting the face against dirt or injury in a relatively permanent manner, and whereby the doll face as well as the rest of the doll body may be washed and cleaned and kept clean without injuring the doll or plaque without any complicated cleaning process being necessary.

Another object has been to provide for the accomplishment of the aforementioned objects in a simple, relatively inexpensive, and yet efficient manner.

These and other objects will appear more fully hereinafter.

Referring now to the accompanying drawing, forming part of this specification:

Fig. 1 is a face view of the photograph;

Fig. 2 is an edge view of the photograph with a celluloid protecting covering shown applied;

Fig. 3 is a sectional view of male and female dies with the photograph and covering between them, positioned to be formed into a three-dimensional product;

Fig. 4 shows the same parts as shown in Fig. 3 in the same view, with the parts being shown after the dies have formed the photograph and covering into a three-dimensional product;

Fig. 5 is a face view of the photograph and its covering after formation and trimming; and Fig. 6 is a view partly in section showing an application of the product to a doll head.

Referring first to Fig. 1 of the drawing, the form of my invention which has been chosen for purposes of illustrating the principle thereof, makes use of an ordinary photograph 10. The photograph should preferably be a full face view. The process of transforming the two-dimensional photograph into a three-dimensional product may be begun, if it is desired to use a protective coating as in the preferred form selected for purposes of illustration, by soaking the picture in a medium such as alcohol. Thereafter the photograph, after having been so soaked, may be laid on a sheet 11 of a substance such as celluloid, and when celluloid is used, the celluloid and the photograph may be passed under a 200–300 degree Fahrenheit roller. After they have been passed under, it will be found that a union has ben made between the photograph and the other substance such as the celluloid specified in the preferred form. Thereafter, the combined photograph and its celluloid covering may be subjected to the first step of the three-dimensional process proper, to wit: treated with steam or hot water at temperatures preferably ranging from 200–300 degrees Fahrenheit, although this may be varied. In the preferred form of my process this treatment is given by leaving the photograph and covering in a steam or hot water tank for about three minutes. The photograph 10, as united to its sheet of celluloid or other such transparent material 11, is shown in Fig. 2.

In performing the next step of the preferred form of my process there is utilized a female die 12 having a mold 13 of a face, for example, of standard form, and a male die 14 having a mold corresponding to the mold 13. The dies are heated in the preferred form to a temperature of about 150 or 200 degrees Fahrenheit, and then the photograph 10 and its united covering 11, after having been treated as aforesaid, are placed between the two dies 12 and 14 as shown in Fig. 3.

The photograph and its covering are then pressed between the two dies as shown in Fig. 4 to produce a three-dimensional face or plaque 16 which includes a three-dimensional covering 17 and a three-dimensional photograph 18, with the covering registering with the photograph as will be manifest.

The product or face or mask 16 may then be applied for use on a doll head or for a plaque as shown in Fig. 6. The product 16 may be filled with a composition such as plaster of Paris or any of the substances commonly used for doll heads and such purposes, and the same may be secured in any suitable manner as by gluing or otherwise to a doll head body 20 to form a unitary doll head.

The principle of my invention will be manifest without further explanation. By using two or three standard dies or molds corresponding to standard faces or standard expressions a very satisfactory likeness of the ordinary face, the ordinary child's face especially, may be obtained. For example, one mold or die may be used for a smiling expression, another may be used for a laughing expression, and another may be used for a plain expression. It will be understood that photographs may be used in sizes to correspond to the dies, and if not in such sizes, may be made such by reduction or enlargement. The edges of the product 16 as shown in Fig. 4 may be trimmed off to give the effect shown in Fig. 5, and when this product is used with a doll head and the usual ears provided on the supplemental doll head, a surprisingly lifelike resemblance is accomplished.

It is desired to emphasize that the provision of the celluloid protective covering and the methods for applying it to the photograph and for making the celluloid covering three-dimensional are not essential to the practice of the process of making a three-dimensional photograph and may be omitted. The process of making a three-dimensional photograph or the like may be practised and the product produced apart from the protective covering by utilizing the steam or hot water treatment mentioned and compressing the photograph along between the dies, as will be manifest without further explanation.

While I have illustrated and described the preferred form of construction for carrying my invention into effect and the preferred procedural steps for carrying out the novel method, these are capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. The process of making two dimensional photographs of subjects having common dominant feature characteristics and varying detail characteristics, three dimensional; which consists in forming dies which conform to the dominant characteristics only and pressing the photographs consecutively between the dies to emboss said photographs only along the dominant characteristics whereby the dominant characteristics stand out in relief on said photographs and are modified in appearance by the varying detail differences present in the photographic image only.

2. The process of making two dimensional photographs of subjects having common dominant feature characteristics and varying detail characteristics, three dimensional; which consists in forming dies which conform to the dominant characteristics only, softening the material on which the photographs are made, and pressing the photographs consecutively between the dies to emboss said photographs only along the dominant characteristics whereby the dominant characteristics stand out in relief on said photographs and are modified in appearance by the varying detail differences present in the photographic image only.

3. The process of making two dimensional photographs of subjects having common dominant feature characteristics and varying detail characteristics, three dimensional; which consists in forming dies which conform to the dominant characteristics only, softening and heating the material on which the photographs are made, and pressing the photographs consecutively between the dies to emboss said photographs only along the dominant characteristics whereby the dominant characteristics stand out in relief on said photographs and are modified in appearance by the varying detail differences present in the photographic image only.

4. The process of making two dimensional photographs of subjects having common dominant feature characteristics and varying detail characteristics, three dimensional; which consists in forming dies which conform to the dominant characteristics only, treating the photographs with water at about 200 to 300 degrees Fahrenheit, and pressing the photographs consecutively between the dies to emboss said photographs only along the dominant characteristics whereby the dominant characteristics stand out in relief on said photographs and are modified in appearance by the varying detail differences present in the photographic image only.

5. The process of making two dimensional photographs of subjects having common dominant feature characteristics and varying detail characteristics, three dimensional; which consists in forming dies which conform to the dominant characteristics only, soaking the photographs in alcohol, applying a transparent protective coating to the same, softening and heating the photograph and pressing the photographs consecutively between the dies to emboss said photographs only along the dominant characteristics whereby the dominant characteristics stand out in relief on said photographs and are modified in appearance by the varying detail differences present in the photographic image only.

6. The process of making two dimensional photographs of subjects having common dominant feature characteristics and varying detail characteristics, three dimensional; which consists in forming dies which conform to the dominant characteristics only, uniting each photograph with a celluloid coating, softening the photographs and their coatings by heating and moisture, and pressing the photographs consecutively between the dies to emboss said photographs only along the dominant characteristics whereby the dominant characteristics stand out in relief on said photographs and are modified in appearance by the varying detail differences present in the photographic image only.

PAUL KIMSEL.